Mar. 27, 1923.
D. E. MORRIS ET AL
1,449,909
LOCK
Filed June 2, 1922
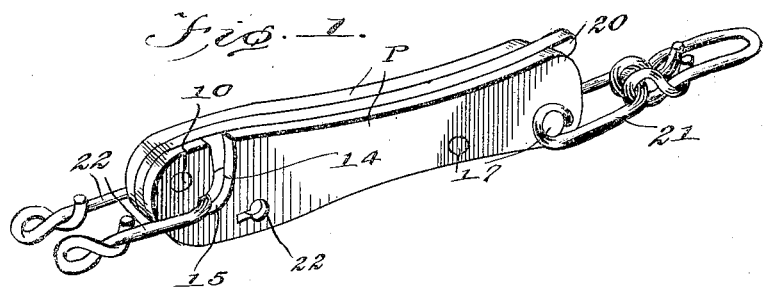
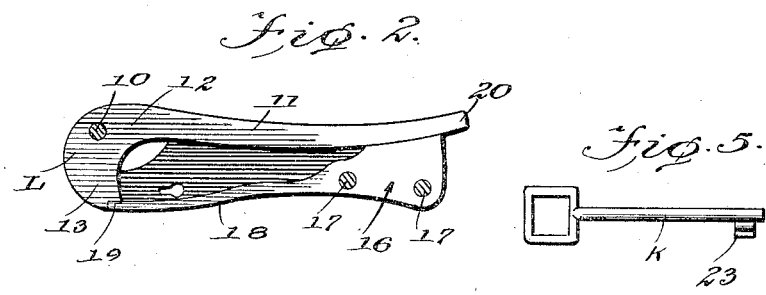
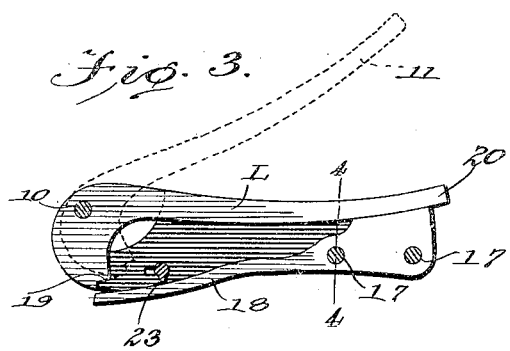
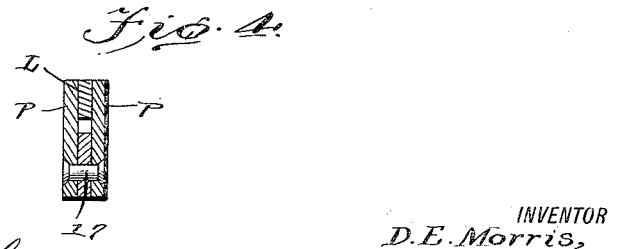
WITNESSES
INVENTOR
D. E. Morris,
T. T. Morris,
BY
ATTORNEYS Patented Mar. 27, 1923.

1,449,909

UNITED STATES PATENT OFFICE.

DAVID E. MORRIS AND THOMAS T. MORRIS, OF WHAT CHEER, IOWA.

LOCK.

Application filed June 2, 1922. Serial No. 565,489.

*To all whom it may concern:*

Be it known that we, DAVID E. MORRIS and THOMAS T. MORRIS, citizens of the United States, and residents of What Cheer, in the county of Keokuk and State of Iowa, have invented certain new and useful Improvements in Locks, of which the following is a specification.

This invention relates to improvements in locks. The invention more particularly relates to a form of lock for securing together the end links of a chain or the like, and is particularly adapted for locking together the end links of a traction chain such as used on the wheels of motor vehicles.

Among the objects of the invention is to provide a lock of the above character which will serve as a link for connecting together the ends of a traction chain, or the like; which will prevent the possibility of theft of the traction chains with which the lock may be employed; which will permit the traction chain to be quickly and easily detached therefrom; and which is extremely simple in construction and durable.

Other objects, and objects relating to details of construction, combination and arrangement of parts will hereinafter appear in the detailed description to follow.

The invention is illustrated by way of example in the accompanying drawings, in which:—

Figure 1 is a perspective view of the lock and showing the same connected to the end links of a chain.

Figure 2 is a vertical longitudinal sectional view of the lock showing the locking lever lowered.

Figure 3 is a view similar to Figure 2 and also showing in dotted lines the locking lever when in its raised position.

Figure 4 is a transverse sectional view taken substantially on the line 4—4 of Figure 3.

Figure 5 is a view in detail showing a side elevation of key employed.

Referring to the drawings more particularly, the lock consists in a pair of elongated plate members P between which there is fulcrumed a lever L, said lever being fulcrumed adjacent similar ends of the plates P by a pin 10, as shown. The plates P may be of the shape shown although not necessary. The lever L consists in an elongated shank portion 11 which is slightly curved upwardly toward its one end from a point intermediate its ends, while its other end is formed with an enlargement 12 through which the pin 10 extends, and said enlargement being curved downwardly, as shown, to provide a projecting portion 13 which is disposed between the plates P. Each plate at a point adjacent the pivot pin 10 for the lever L is formed with a recess 14 which terminates at its lower end in an arcuate section 15, and said arcuate section being disposed beneath a horizontal plane corresponding to the longitudinal axis of the pivot pin 10.

Between the ends of the plates P opposite to that of the pivot pin 10 there is secured a spacer plate 16, said plate being secured by the rivets 17 and having extending rearwardly therefrom a tongue or latch member 18 which is of resilient material and the rear end thereof adapted to engage in a notch 19 of the lever portion 13, whereby to hold the lever in a lowered position as illustrated in Figures 1 and 2 in an obvious manner. Also, as shown in the figures of the drawings, the free end of the lever projects from the plates P as at 20 in order to facilitate the lifting of said lever. If desired this projecting portion might be turned downwardly and would serve the same function. A foremost pin 17 is extended from the sides of the plates P in order that a chain link as at 21 may be secured thereto in the manner shown. This form of connection provides a pivot connection between the lock and the one end of the chain. It is of course to be understood that other arrangements of connecting the locks to the chain may be used with equal advantages.

The chain link 22 occurring at the other end of the chain with which the lock may be associated should be positioned as shown in Figure 1, which may be accomplished by slipping this link over the free end of the lever L and then bringing the bridge portion of the link within the recesses 14 of the plates P so that the same may move to the portion 15 of said recesses and be disposed beneath the fulcrumed point.

In each of the plates P there should be provided a key hole as at 22 adapted to receive the key K, shown in Figure 5 of the drawings. This key is provided at its end with a radial extension 23 which upon rotation of the key is adapted to engage the latch extension 18 and move the same downwardly as illustrated in Figure 3 so that the latch is disengaged from the lever L.

The lock may be applied in the manner shown in Figure 1 for connecting the ends of a chain, or the like, and when it is desired to disconnect the link 22, then the key K should be inserted and the latch 18 operated to release the lever L. The lever now may be swung upwardly and the link 22 lifted from the recesses 14 of the plates P. When it is desired to lock the ends of the chain together then the link 22 should be again positioned in the recesses 14 of the plates P and the lever L lowered, and upon said lever reaching its lowered position the latch 18 will automatically lock the lever in this position. It should be pointed out that by arranging the link 22 as is shown in Figure 1, that is, by having the same to pull on the plates P at a point below the fulcrum pin 10 of the lever L, the same engages the portion 13 of said lever and at all times holds the free end of the lever against upward swinging movement. This is an advantage in that should the lever become unlocked accidentally or otherwise, the chains however would not be released.

While I have shown and described the preferred form of my invention, I wish it to be understood that I am aware of the fact that the construction, combination and arrangement of parts may be changed by those skilled in the art without departing from the spirit of the invention, as indicated by the appended claims.

We claim:—

1. A pair of elongated body plate members, an elongated lever having its one end formed with an enlargement and said end fulcrumed between similar ends of said plates, while the other end of said lever is adapted to extend beyond the other ends of the body plates, a spacing plate between the last named ends of the body plates having an extension of resilient material adapted to engage in a notch in the enlargement of the fulcrumed end of said lever for holding the free end of said lever against upward swinging movement, a pin extending through the ends of the body plates between which the spacer plate is secured adapted to permit a chain link adapted to be connected with said lock, and said body plates each having a recess formed in its end associated with the fulcrumed point of said lever adapted to receive the link of a chain and also adapted to permit the link to be disposed below the fulcrumed point of said lever, and a key adapted to extend through a key-hole in one of said plates and having a protrusion formed thereon whereby with the turning of the key the extension of the spacer plate may be moved for releasing the lever.

2. A pair of elongated plate members, an elongated lever having its one end formed with an enlargement and said end fulcrumed between similar ends of said plates, while the other end of said lever is adapted to extend beyond the other ends of the plates, a spacing plate between the last named ends of the plates having an extension of resilient material adapted to engage in a notch in the enlargement of the fulcrumed end of said lever for holding the free end of said lever against upward swinging movement, a pin extending through the ends of the plates associated with said spacer plate adapted to permit a chain link to be connected with said lock, and said plates each having a recess formed in its ends associated with the fulcrumed point of said lever adapted to receive the link of a chain and also adapted to permit the link to be disposed below the fulcrumed point of said lever.

3. A pair of elongated plate members, an elongated lever having its one end formed with an enlargement and said end fulcrumed between similar ends of said plates, while the other end of said lever is adapted to extend beyond the other ends of the plates, a spacing plate between the last named ends of the plates having an extension of resilient material adapted to engage in a notch in the enlargement of the fulcrumed end of said lever for holding the free end of said lever against upward swinging movement, means whereby a chain link may be pivotally connected to the last named ends of said plates, and said plates each having a recess formed in its ends associated with the fulcrumed point of said lever adapted to receive the link of a chain and also adapted to permit the link to be disposed below the fulcrumed point of said lever.

4. A lock of the character described, comprising a pair of elongated plate members having registering transverse slots therein adapted to accommodate a link, a lever pivoted between said plates adapted to be folded so that the same will close the opening of said slots whereby to hold the link within the slots, a spring finger carried between said plates and adapted to automatically engage with a notch in the pivoted end of said lever for holding said lever in its lowered or folded position, and a key adapted for moving said spring finger from said notch whereby to release the lever.

5. A lock of the character described, comprising a pair of elongated plate members having registering transverse slots therein adapted to accommodate a link, a lever pivoted upon said plates adapted to be folded so that the same will close the openings of said slots whereby to hold the link within the slots, yieldable means carried by said plates adapted to automatically engage with the lever and thereby hold said lever in its lowered or folded position, and means whereby the last named means may be operated for releasing said lever.

DAVID E. MORRIS.
THOMAS T. MORRIS.